(No Model.)
C. W. BLACKBURN.
WHIFFLETREE HOOK.
No. 462,195. Patented Oct. 27, 1891.
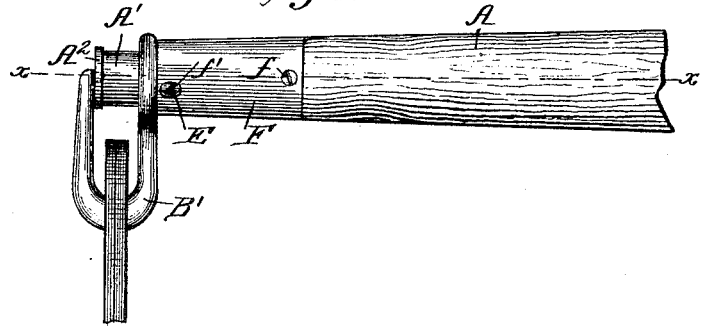
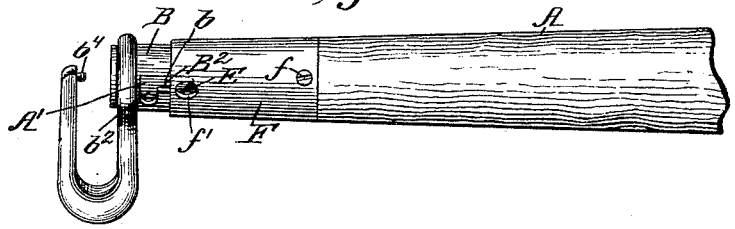
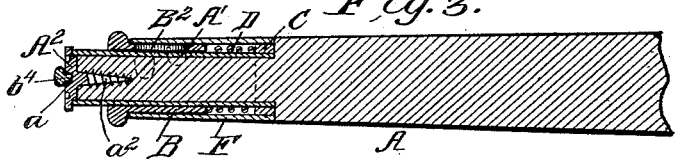
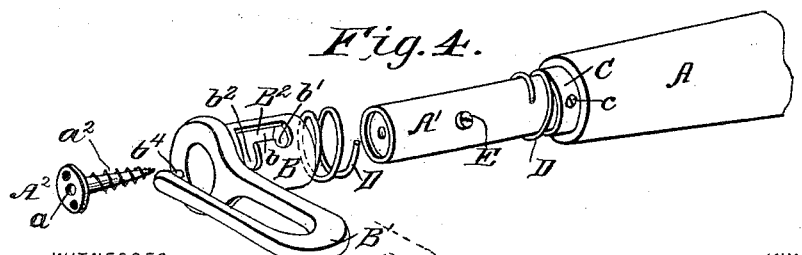
WITNESSES:
W. D. Bloudel
Geo. H. Evans
INVENTOR:
Charles W. Blackburn.
BY Munn & Co
ATTORNEYS

UNITED STATES PATENT OFFICE.

CHARLES W. BLACKBURN, OF TOMBSTONE, ARIZONA TERRITORY, ASSIGNOR OF ONE-HALF TO JOHN J. PATTON, OF SAME PLACE.

WHIFFLETREE-HOOK.

SPECIFICATION forming part of Letters Patent No. 462,195, dated October 27, 1891.

Application filed January 17, 1891. Serial No. 378,166. (No model.)

*To all whom it may concern:*

Be it known that I, CHARLES W. BLACKBURN, a citizen of the United States, residing at Tombstone, in the county of Cochise and Territory of Arizona, have invented certain new and useful Improvements in Whiffletree-Hooks, of which the following is a specification, reference being had to the accompanying drawings, in which—

Figure 1 is an inverted plan of the improved whiffletree-hook with the hook in its locked position. Fig. 2 is a similar view with the hook in its unlocked position. Fig. 3 is a section on line X X, Fig. 1. Fig. 4 is a view of the parts disconnected. Fig. 5 is an end view, the hook being shown locked in full lines and swung up into its unlocked position in dotted lines.

The invention consists in certain improvements in whiffletree-hooks, the object being to provide a hook which will securely lock the trace against accidental displacement.

The invention consists in the construction and arrangement of parts, as will be hereinafter described and claimed.

A represents the end of a whiffletree provided with a ferrule A' at its outer end. Upon this ferrule turns and slides the sleeve B, which carries the trace-hook B' on its outer end. The sleeve B is provided with bayonet-joint slot $B^2$, comprising a longitudinal branch $b$ and two parallel transverse branches $b'$ $b^2$, of which the branch $b^2$ is the longer.

C is a collar secured fixedly by a screw $c$ upon the inner end of the ferrule A, to which is connected one end of a spiral spring D, surrounding the ferrule and connected at its other end to the sleeve B, so that it exerts a torsional strain on said sleeve to rotate it. A screw or pin E passes through the bayonet-joint slot $B^2$ and completes the bayonet-joint.

The trace-hook B' is provided at its extremity with an inward-extending lug or projection $b^4$ in alignment with an aperture $a$ in the center of a flange $A^2$ on the outer end of the ferrule A' and adapted to enter said aperture when the said hook is locked in its operative position. This flange $A^2$ is shown separate from the ferrule A' and having a screw $a^2$ on its inner face, screwing into the end of the whiffletree over the end of the said ferrule, though, if desired, the end of the ferrule might be otherwise closed.

The operation is as follows: Suppose the hook to be in its locked position, as shown in Figs. 1 and 2, and it is desired to remove a trace therefrom, it will simply be necessary for the operator to first pull upward on the hook B', which will rotate the sleeve B until the pin E passes from the branch $b^2$ of the slot $B^2$ into the branch $b$, and then pull the hook outward until the branch slot $b'$ registers with the screw or pin E, when the spring will rotate the sleeve and cause said branch $b'$ to receive the pin, after which the hook will be locked in its open position, as shown in Fig. 2. The hook will remain in this position until it is again desired to attach the trace, which is accomplished by passing its end onto the hook, then turning the hook down to disengage pin E and branch slot $b'$, then pushing the hook and sleeve inward until branch slot $b^2$ aligns the pin, whereupon the spring will rotate the sleeve till the end of the said branch strikes the pin E, in which event the hook will be locked from being accidentally moved outward and releasing the trace. The lug or projection $b^4$ will now project into the aperture $a$ and tend to equalize the strain on the hook. In order that the spring D may be protected, I provide the outer sleeve F, which fits over the collar C and sleeve B, a screw $f$ securing it in place. The said outer sleeve is provided with an opening $f'$, through which the screw or pin E is passed into the ferrule or thimble A'.

Various modifications of the device will suggest themselves to the mechanic, and hence I do not restrict myself to the exact construction shown.

Having thus described my invention, what I claim as new, and desire to secure by Letters Patent, is—

1. A whiffletree-hook consisting in a ferrule adapted to be secured on the end of a whiffletree, a trace-hook at right angles to the ferrule, having its inner arm mounted to slide in and out on said ferrule, and a pin-and-slot connection between the said inner arm and the ferrule to lock the hook in its inner or outer positions, the free end of the other arm of the hook being adapted to enter a trace-eye when the hook is slid outward and to lock the trace when the hook is slid inward, substantially as set forth.

2. A whiffletree-hook consisting in a ferrule, a trace-hook projecting forward therefrom and adapted to be swung upward and slid outward and inward at the end of its inner member on said ferrule, and a pin-and-slot connection between said inner member and the sleeve to limit both the swinging and the sliding movement of the hook, the end of the outer member of the hook being adapted to receive a trace-eye when the hook is moved upward and outward, and to lock it when the hook is swung downward and inward, substantially as set forth.

3. The combination, with a whiffletree, of a rotary longitudinally-movable sleeve thereon provided with a trace-hook, a pin-and-slot connection for locking the sleeve in its innermost position, and a spring holding the pin and slot engaged, substantially as set forth.

4. A whiffletree-hook comprising an attaching thimble or ferrule, a rotary sleeve adapted to slide in and out on the thimble or ferrule and provided with a hook the free extremity of which extends back adjacent to or across the end of the said thimble, and a bayonet-joint connecting said sleeve and thimble, substantially as set forth.

5. A whiffletree-hook comprising an attaching ferrule or thimble, a sleeve turning and sliding thereon and provided with a trace-hook the free end of which projects back adjacent to or across the outer end of the thimble, a bayonet-joint connection between the thimble and sleeve, and a spiral spring on the thimble, exerting a torsional strain on the said sleeve; substantially as set forth.

6. A whiffletree-hook comprising an attaching ferrule or thimble, a sleeve rotating and sliding on the thimble and having a bayonet-joint connection therewith, a trace-hook projecting from the sleeve and extending back across the outer end of the thimble or ferrule and having an inward-extending lug or extension, and the torsional spring acting on said sleeve, substantially as and for the purpose set forth.

7. A whiffletree-hook comprising an attaching ferrule or sleeve, a sleeve turning and sliding thereon and having a bayonet-joint connection therewith to lock the sleeve in its inner or outer position, the trace-hook extending back to the end of the ferrule, a collar on the inner end of the ferrule or thimble, a spiral spring around said ferrule and connecting the collar and sleeve, and the outer casing or sleeve inclosing the collar and the sleeve, substantially as and for the purpose set forth.

8. A whiffletree-hook comprising an attaching ferrule or sleeve, a flange at the outer end provided with an aperture, and a spring-rotated sleeve on the ferrule, having a bayonet-joint connection therewith and provided with a hook having an inward-extending lug or extension registering with said aperture, substantially as and for the purpose set forth.

CHARLES W. BLACKBURN.

Witnesses:
WILLIAM REYNOLDS,
B. A. PACKARD.